United States Patent [19]

Winter et al.

[11] Patent Number: 4,493,375
[45] Date of Patent: Jan. 15, 1985

[54] METHOD AND APPARATUS FOR FORMING AND REFORMING A FURROW

[75] Inventors: David C. Winter, Des Moines; Michael L. Pearson; John D. Long, both of Ankeny, all of Iowa

[73] Assignee: Deere & Company, Moline, Ill.

[21] Appl. No.: 414,994

[22] Filed: Sep. 7, 1982

[51] Int. Cl.³ .................... A01B 35/18; A01B 69/00; A01B 79/00
[52] U.S. Cl. ........................ 172/1; 172/26; 172/176; 172/519; 172/536
[58] Field of Search .............. 172/1, 26, 134, 146, 172/149, 175, 176, 126, 519, 536; 180/131; 104/244.1; 301/38 R, 39 R, 39 T, 40 S

[56] References Cited

U.S. PATENT DOCUMENTS

| 549,247 | 11/1895 | Moser | 172/180 |
|---|---|---|---|
| 611,805 | 10/1898 | Autry | 172/77 |
| 683,220 | 9/1901 | Neill et al. | 301/39 R |
| 922,405 | 5/1909 | Dreyer | 172/536 |
| 950,604 | 3/1910 | Rogers | 104/244.1 |
| 1,019,199 | 3/1912 | Sutton | 172/26 |
| 1,628,158 | 5/1927 | Krengel | 172/176 |
| 1,678,910 | 7/1928 | Keller | 172/398 |
| 2,505,276 | 4/1950 | Boroski | 172/536 |
| 2,525,545 | 10/1950 | Hanson | 172/536 |
| 3,047,077 | 7/1962 | Simpson et al. | 172/519 |
| 3,797,602 | 3/1974 | Sumida | 180/131 |
| 3,840,076 | 10/1974 | Capehart | 172/1 |
| 3,998,275 | 12/1976 | Eisenhardt | 172/26 |
| 4,228,860 | 10/1980 | Orthman | 172/26 |

FOREIGN PATENT DOCUMENTS

| 227741 | 1/1969 | U.S.S.R. | 172/126 |
|---|---|---|---|
| 615877 | 6/1978 | U.S.S.R. | 172/176 |

*Primary Examiner*—Richard T. Stouffer

[57] ABSTRACT

To form a furrow for row guidance systems, a shank is mounted on a frame forwardly of a wheel which includes a V-shaped tire. The shank opens the ground and the tire crushes clods and packs the sides of the furrow. Depth bands on each side of the tire shape the edges of the furrow and prevent loose dirt from rolling back into the furrow. When utilized to reform a furrow, the frame is pivotally connected to the implement for rocking about an upright axis to allow the wheel to trail and average out guidance system corrections and driver steering corrections so that the reformed furrow will be more accurate for the next operation.

13 Claims, 4 Drawing Figures

METHOD AND APPARATUS FOR FORMING AND REFORMING A FURROW

BACKGROUND OF THE INVENTION

The present invention relates generally to implement guidance systems and more specifically to forming guidance furrows for establishing an accurate reference for such systems.

Automatic guidance or steering systems for row crop implements have been available in various forms for many years. A majority of such systems rely on a preestablished groove or furrow in the ground to provide a reference location from which the implement or towing vehicle is guided. The success or failure of these systems depends largely on the quality of the furrow at the time it is to be sensed, which can be weeks or even months after it is formed. The furrow must be able to withstand heavy rains and also must be free of clods, rocks and other obstacles. The size and integrity of the furrow must be sufficient to guide whatever type of furrow sensor is utilized with the guidance system. An inadequate furrow can render the guidance system useless and result in crop damage when the implement is guided or steered improperly with respect to the rows of crop.

Numerous furrow-forming devices are available but most are not entirely satisfactory. A single rigid or spring trip shank mounted on the implement tends to turn up clods which roll back into the furrow, and the loose sides of the furrow formed by the shank do not weather well in heavy rains. V-shaped rubber tires or wheels have been used but do not penetrate well in hard soil. In addition, loose soil often flows around the wheel hub and fills the furrow.

To aid soil penetration, some available furrowers are rigidly mounted on the implement frame, and therefore obstacles such as rocks encountered by the furrower can actually lift the entire implement. Implement depth control can therefore be adversely affected, and the furrower is subjected to heavy loading.

When the furrower is mounted on a steered or guided implement and is utilized to reform a furrow, transverse movements of the implement caused by the guidance system or by the driver's steering corrections cause the remade furrow to deviate from a path substantially parallel to the row. Consequently, the reformed furrow provides a less than optimum reference for future guidance. The deviation from a desired path is particularly noticeable when the furrower is attached to a rear-mounted implement because initial steering corrections can momentarily move the implement further off-center with respect to the rows.

It is therefore an object of the present invention to provide an improved method and apparatus for forming a guidance furrow. It is another object to provide such a method and apparatus which overcomes the above-mentioned problems.

It is a further object of the invention to provide an improved method and apparatus for forming a guidance furrow which can withstand heavy rains. It is yet another object to provide such a method and apparatus for forming a furrow relatively free from loose dirt, clods and rocks or other obstacles.

It is yet another object of the present invention to provide an improved method and apparatus for establishing a guidance furrow from an implement which itself is guided or steered by a guidance furrow.

It is still another object to provide a method and apparatus for establishing an accurate guidance furrow from an implement, wherein movements of the implement transverse to the forward direction are averaged out to prevent corresponding deviations in the furrow.

It is a further object of the invention to provide an improved furrowing device which penetrates hard soils better than at least some of the previously available devices and which provides a high quality, long-lasting furrow with well packed sides and edges. It is another object to provide such a furrowing device which can still easily move over obstacles such as rocks.

In accordance with the above objects, a furrowing tool is provided, including a fore-and-aft frame supporting a soil-penetrating shovel ahead of a vertically rockable furrow-forming wheel. The shovel loosens the soil, and the wheel forms a furrow with packed sides. Depth bands or the like packing elements extend outwardly from the rim of the wheel to pack the edges of the furrow and to prevent loose dirt, and clods and other obstacles from falling into the furrow. A high quality, long-lasting furrow is established.

When utilized to remake a furrow, the frame is pivotally connected to the implement for rocking transversely to permit the shovel and furrow-forming tool to trail the implement and therefore average out transverse movements caused by the implement guidance system or operator steering corrections. The remade furrow therefore provides a more accurate reference for future operations.

These and other objects, features and advantages of the present invention will become apparent from the description which follows and from the drawings.

DESCRIPTION OF THE PREFERRED EMBODIMENT

Figure 1:
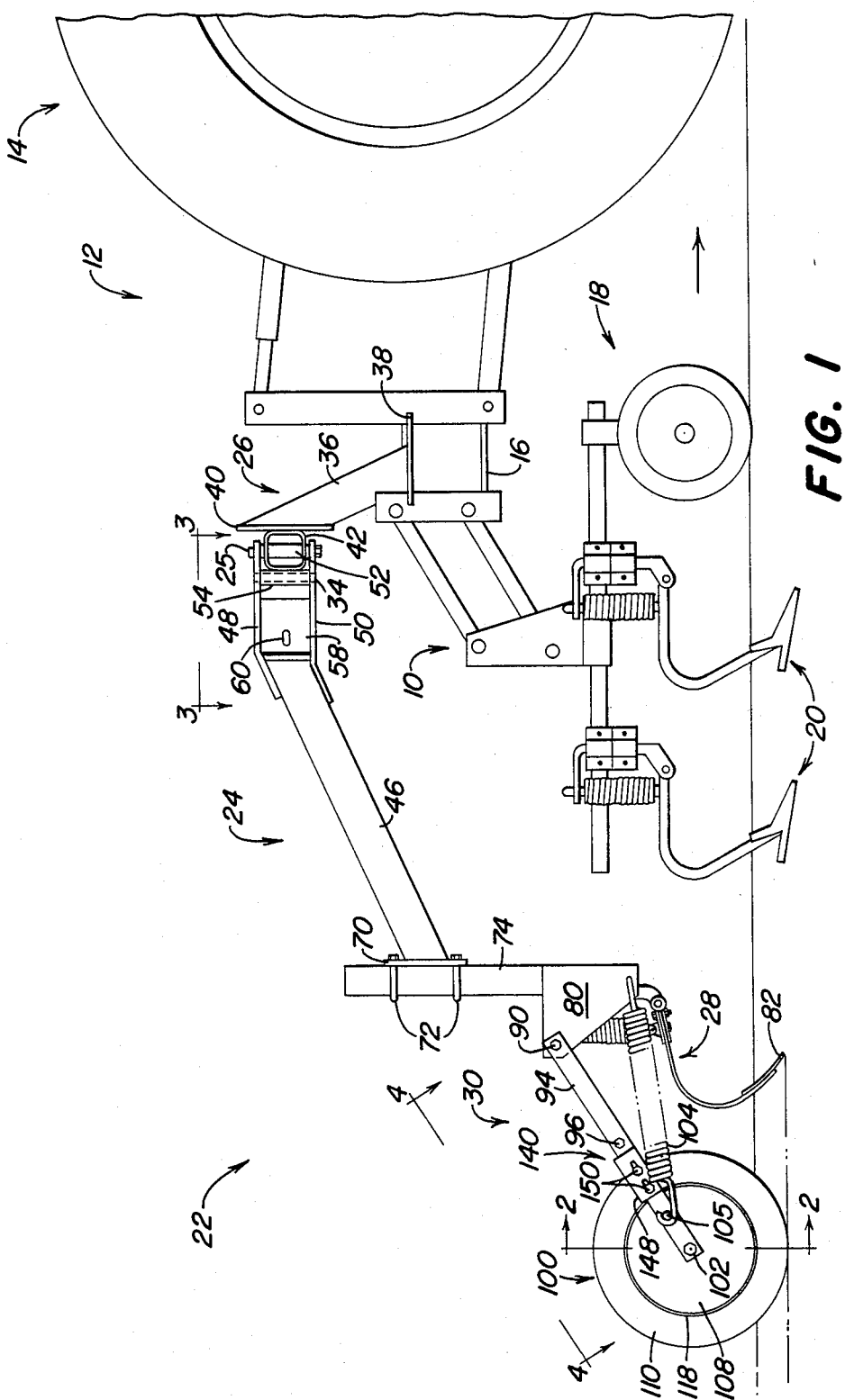
FIG. 1 is a side view of a tractor-mounted implement with the furrower of the present invention attached thereto.

Referring now to FIG. 1, therein is shown a row crop cultivator 10 connected by vertically positionable hitch structure 12 to the rear of a towing vehicle 14 for forward movement through a field of crops planted in parallel rows. The cultivator 10 includes a main transverse beam or toolbar 16 supporting a plurality of conventional cultivator rigs 18. The rigs 18 are transversely spaced on the toolbar 16 and include soil-working tools 20 for tilling the soil between the rows of plants. An automatic guidance or steering system (not shown), such as described in co-pending application entitled IMPLEMENT GUIDANCE SYSTEM AND HITCH STRUCTURE THEREFORE Ser. No. 390,106, filed June 21, 1982, now U.S. Pat. No. 4,463,811 and assigned to the assignee of the present invention, is also attached to the implement 10 for positioning the rigs 18 with the rows. The guidance system includes a furrow follower for following a preestablished furrow in the ground. It is to be understood that the present invention may be utilized with numerous other types of automatic guidance and steering systems as well as with manually steered or guided implements.

As best seen in FIG. 1, the furrow-forming device 22 of the present invention includes a fore-and-aft extending frame, indicated generally at 24, pivotally connected at its forward end by an upright pin 25 to a stand assembly 26 attached to the toolbar 16 between an adjacent pair of rigs 18. The aft end of the frame 24 supports a soil-working tool 28, preferably a quick-return spring trip shank assembly, and a furrow-forming wheel assembly 30 rearwardly adjacent the shank assembly 28. The pivotal connection permits the aft end of the frame 24, and therefore the asemblies 28 and 30, to trail the implement 10, that is, to rock to the right or left with respect to the implement as the implement moves transversely to the left or right, respectively, during guidance or steering corrections so that a more accurate guidance furrow is formed.

Although the furrow-forming device 22 is shown supported from a row crop cultivator, it is to be understood that the device may also be utilized with numerous other types of implements, either to reform or remake a furrow or to form the original guidance furrow, for example, with a planter when planting the row crops. When utilized to establish an original guidance furrow, the operator may lock the frame 24 against rocking with a pin 34 so the frame 24 and assemblies 28 and 30 do not trail but rather are fixed in the transverse direction with respect to the supporting implement. A more detailed description of the furrow-forming device 22 follows.

Figure 3:
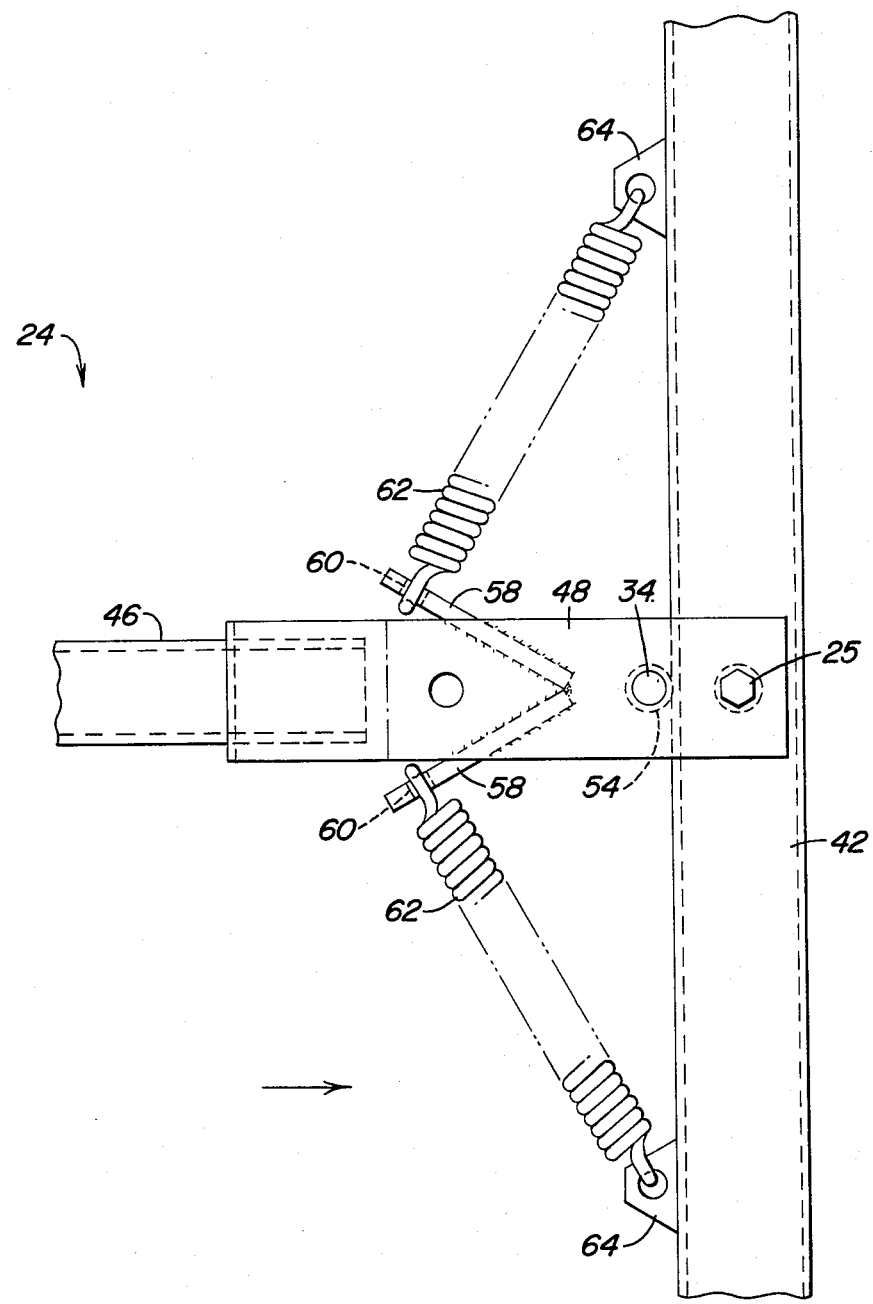
FIG. 3 is a top view of the support assembly taken along lines 3—3 of FIG. 1.
Figure 4:
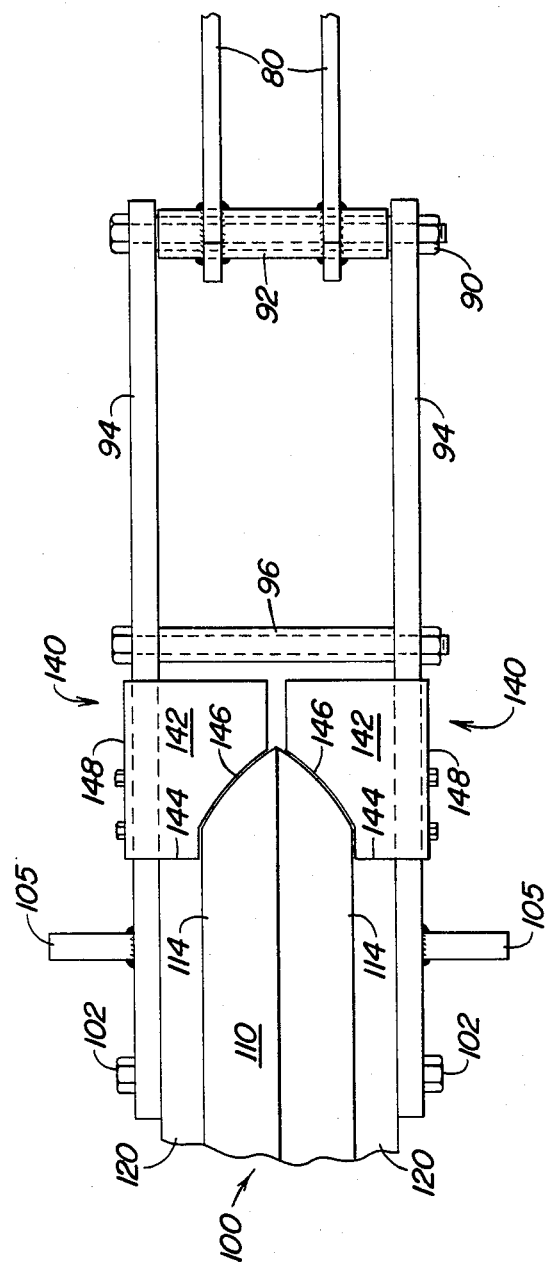
FIG. 4 is a view taken along lines 4—4 of FIG. 1 showing a portion of the furrow wheel support arm.

The stand assembly 26 includes an upwardly and rearwardly inclined tubular beam 36 with a lower horizontal mounting plate 38 secured in a conventional manner such as by U-bolts (not shown) to the upper face of the toolbar 16. An upright plate 40 is welded to the upper end of the beam 36 and carries a transverse front support beam 42. The forward end of a downwardly and rearwardly directed tubular beam 46 is welded to horizontally disposed upper and lower frame plates 48 and 50 which extend forwardly along the upper and lower faces of the beam 42. A bushing assembly 52 extends through the faces of the beam 42 between the plates 48 and 50 and receives the pin 25 to permit the frame 24 to rock in the transverse direction while substantially restraining movement vertically. The pin 34 when inserted extends through the plates 48 and 50 adjacent the rear face of the beam 42 and through a bushing 54 welded to the face (FIG. 3). The pin 34 prevents the plates 48 and 50 and thus the entire frame 24 from pivoting from a position transverse to the axis of the beam 42.

A pair of upright, rearwardly diverging plate members 58 are welded between the plates 48 and 50 and include apertures 60. A pair of identical springs 62 include hooked ends which are inserted through the apertures 60. The opposite ends of the springs 62 are connected to respective spring mountings 64 welded to the front face of the beam 42 at locations equally spaced on opposite sides of the plates 48 and 50. The springs 62 bias the frame 24 toward the central position shown in FIG. 3.

An upright leg bracket 70 (FIG. 1) is welded to the aft end of the beam 46 and includes a pair of U-bolts 72 adjustably supporting a vertical tubular leg 74 rearwardly of the rig assemblies 18. The stand assembly 26 provides sufficient vertical clearance between the implement 10 and the frame 24 so that the frame can trail without interfering with any portion of the implement.

A pair of upright plates 80 is welded to the opposite sides of the leg 74 and support mounting structure (not shown) for attaching the spring trip shank assembly 28. The shank assembly 28 preferably includes a narrow pointed shovel 82 for loosening the soil directly ahead of the wheel assembly 30. The U-bolts 72 are loosened and the leg 74 is moved vertically to adjust the depth of penetration of the shovel 82.

The furrow-forming wheel assembly 30 is connected to the plates 80 for rocking vertically with respect thereto by a pin 90 extending transversely through a bushing assembly 92 welded to the upper rear corners of the plates 80. The assembly 30 includes a pair of transversely spaced straps or arms 94 extending rearwardly and downwardly from pivotal connections with the pin 90. A spacer 96 is bolted between central portions of the straps 94. A marker or furrow-forming wheel 100 is journalled for rotation about the axis of a transverse pin or axle 102 supported between the aft ends of the straps 94. The wheel 100 is rockable vertically about the axis of the pin 90 and is biased downwardly into the soil loosened by the shovel 82 by springs 104 (FIG. 1) tensioned between the lower ends of the plates 80 and outwardly projecting support pins 105 located on the straps 94. To prevent the wheel assembly 30 from rocking downwardly against the shank assembly 28 when the implement 10 is raised from the ground-working position, a stop member (not shown), such as a slotted strap, is connected between the plates 80 and the spacer 96.

Figure 2:
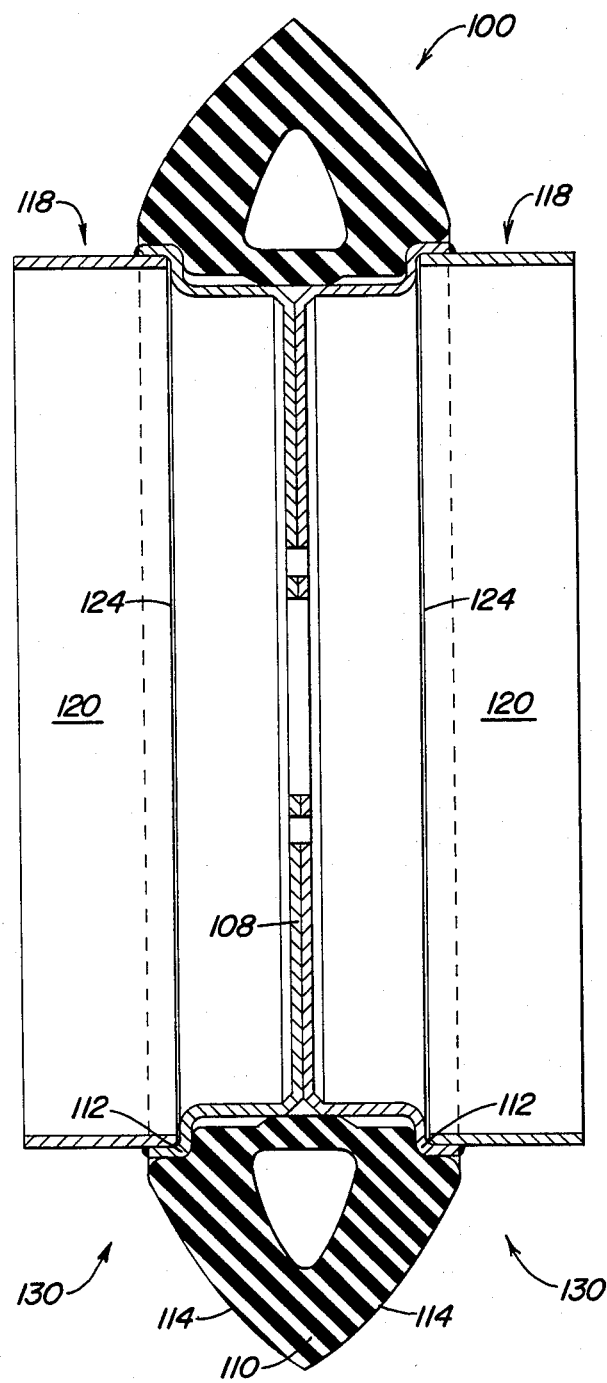
FIG. 2 is a sectional view of the furrow wheel taken along lines 2—2 of FIG. 1.

The furrow-forming wheel 100 includes a split rim assembly 108 connected to a conventional hub assembly (not shown) which receives the pin 102. A tire 110 is supported on the rim assembly 108 between flanges 112. As best seen in FIG. 2, the tire 110 extends radially outwardly of the flanges 112 and has slightly convex inclined sides 114 defining a generally V-shaped soil-forming portion. The flanges 112, which provide outwardly facing stepped shoulders, each receive depth band or press rim structure 118 having a rim extension or cylindrical band 120 which is supported at its inwardly facing edge by the flange 112. A disk-like member 124 is welded to the inwardly facing edge of the band 120. The two assemblies 118 are urged towards each other and against the shoulders of the flanges 112 by bolts (not shown) extending through apertures in the members 124 and rim assembly 108.

The extensions or bands 120 and the tire 110 define furrow edge packing structure, indicated at 130 in FIG. 2, which packs the edge of the furrow. The bands 120 also act as a barrier to prevent loose dirt, rocks and the like from falling into the furrow. The bands 120 also provide depth control for the wheel 100.

A pair of scrapers 140 is connected to the straps 94 for preventing dirt build-up on the tire 110 and bands 120. Each scraper 140 has a flat upper portion 142 supported on the upper face of the strap 94 and includes a rear edge 144 and inner edge 146 conforming to the shape of the band 120 and tire side 114, respectively. A slotted side member 148 extends downwardly at a right angle from the portion 142. Bolts 150 (FIG. 1) inserted through the slots and the strap 94 secure the scraper 140 to the strap. The slots permit fore-and-aft adjustment of the scrapers 140 for proper positioning the edges 144 and 146 with respect to the wheel 100.

In operation, the implement 10 is towed forwardly through the field with the shovel 82 of the spring trip shank assembly 28 opening and loosening the soil immediately ahead of the wheel 100. The wheel 100, biased downwardly by the springs 104, rotates in the soil to form a furrow. The tire 110 crushes clods and packs the sides of the furrow. The bands 118 cooperate with the tire 110 to shape and pack the edges of the furrow and to prevent loose soil from rolling back into the furrow. The spring trip shank assembly 28 trips up over rocks and other obstacles, and the wheel 100 moves against the bias of the springs 104 over obstacles, to prevent extreme loads on the frame 24 which could act to lift or rotate the implement toolbar 16.

When the pin 34 is removed from the bushing 52, the furrow-forming device 22 trails the implement 10 to average out the transverse movements of the toolbar 16, such as occur with tractor steering corrections or implement guidance corrections (or a combination of both). To provide a good averaging effect, the distance between the pivot 25 and the axis 102 of the furrow-forming wheel 110 is substantially greater than the maximum expected transverse movements of the implement frame which in row crops are typically only a fraction of the spacing between adjacent rows.

Having described the preferred embodiment, it will be apparent that modifications can be made without departing from the scope of the invention as defined in the accompanying claims.

We claim:

1. A device adapted for connection to an implement toolbar for forming a guidance furrow in the ground as the toolbar is towed forwardly through a field, said device comprising: a frame adapted for attachment to the toolbar; a shank attached to the frame and including ground-engaging shovel means for penetrating the surface of the ground; wheel means supported on the frame rearwardly adjacent the shank for rotation in, and forming of, the ground penetrated by the shovel means, said wheel means including an outermost circumferential portion having a generally V-shaped configuration for forming a V-shaped furrow, a circular band member supported radially inwardly with respect to the V-shaped portion, said band member extending transversely outwardly beyond the outermost circumferential portion and cooperative therewith to pack the edges of the furrow and to prevent loose soil from falling into the furrow, and means for averaging out abrupt transverse movements of the toolbar to prevent corresponding deviations in the formed furrow, said means for averaging including a bracket means for connection to the toolbar, vertical pivot means connecting the frame to the bracket means for permitting the frame to rock transversely with respect to, and to trail, the toolbar.

2. The invention as set forth in claim 1 further comprising means for biasing the frame to a preselected position.

3. The invention as set forth in claim 1 including an arm rockably connected to the frame above the shovel means and extending rearwardly therefrom to an aft end, said aft end rotatably supporting the wheel means directly behind the shovel means.

4. In an implement including a transverse toolbar adapted for forward movement over the ground, said toolbar subject to movement in the transverse direction, a device for forming a guide furrow in the soil, said device comprising: a fore-and-aft extending frame; means pivotally connecting the fore end of the frame to the toolbar for permitting the aft end of the frame to rock laterally and trail the implement; a soil-penetrating tool; means supporting the soil-penetrating tool from the aft end of the frame in contact with the soil; a soil-forming wheel; means journaling the wheel from the aft end of the frame for rotation about a generally transverse horizontal axis rearwardly of the tool for forming a furrow in the soil penetrated by the tool, said wheel and soil-penetrating tool being movable laterally with the aft end of the frame so that the wheel and tool trails the implement and the transverse movements of the toolbar are averaged to lessen corresponding direction changes in the furrow.

5. The invention as set forth in claim 4 including an arm connected to the aft end of the frame for rocking vertically with respect thereto, said wheel supported by the arm for vertical movement therewith, and means for biasing the arm downwardly to urge the wheel into engagement with the soil.

6. The invention as set forth in claim 4 wherein the wheel includes a radially outermost soil-forming portion having a generally triangular cross section, said wheel further including rim members extending transversely from the forming portion and cooperating therewith to pack the edges of the furrow.

7. A furrow-forming device for attachment to an implement having a toolbar with soil-working implements fixed thereto and adapted for forward movement over the ground, said toolbar subject to intermittent movement transverse to the forward direction, said furrow-forming device comprising: a fore-and-aft extending frame adapted to be moved forwardly over the ground by the implement; a ground-engaging shovel supported adjacent the aft end of the frame; a furrow-forming wheel supported from the frame rearwardly of the shovel for rotation about an axis transverse to the forward direction, said wheel including a V-shaped groove-forming peripheral portion, and soil-packing bands extending outwardly on either side of the V-shaped portion for packing the edges of the groove; bracket means adapted for connection to the toolbar; and means pivotally connecting the fore end of the frame to the bracket means for rocking about a generally vertical axis to permit the shovel and wheel to trail the toolbar when attached thereto as the toolbar moves transverse to the forward direction so that transverse deviations of the groove are lessened.

8. The invention as set forth in claim 7 further comprising an arm, means connecting one end of the arm to the aft end of the frame for rocking about a transverse horizontal axis, the opposite end of the arm including means for supporting the wheel for rotation behind the shovel, and spring means biasing the arm downwardly for urging the wheel into contact with the ground.

9. The invention as set forth in claim 7 or 8 further comprising means for selectively locking the frame against rocking about the vertical axis.

10. The invention as set forth in claim 7 or 8 including means for biasing the frame to a preselected position generally parallel to the forward direction.

11. A method of forming a guidance furrow in the ground with respect to a transverse tool-carrying beam of a towed implement, said method including the steps of:

(a) towing the implement forwardly through the field;

(b) pivotally supporting a fore-and-aft extending wheel frame at its forward end from the beam in trailing relationship with respect to the implement;
(c) rotatably supporting a furrow-forming wheel from the aft end of the wheel frame in contact with the soil and permitting said wheel to trail with the wheel frame to average out abrupt movements of the beam in a direction transverse to the forward direction; and
(d) loosening the soil immediately forwardly of the furrow-forming wheel, said step of loosening including supporting a soil-penetrating shovel from the wheel frame for trailing therewith directly ahead of the furrow-forming wheel.

12. The method as set forth in claim 11 wherein step (c) includes:
packing the edges of the guidance furrow by providing cylindrical bands extending outwardly in the direction of the axis of rotation of the wheel, said bands rotating with the wheel in contact with the soil radially inwardly of the outermost circumference of the wheel.

13. The method as set forth in claim 11 further including the step of steering the towed implement at least in part by following a previously established guidance furrow, said steering tending to cause transverse movement of the beam with respect to said established furrow.

* * * * *